(12) United States Patent
Tanigawa

(10) Patent No.: US 11,113,531 B2
(45) Date of Patent: Sep. 7, 2021

(54) ANNOTATION DEVICE, ANNOTATION METHOD, AND NON-TRANSITORY COMPUTER-READABLE STORAGE MEDIUM

(71) Applicant: Panasonic Intellectual Property Corporation of America, Torrance, CA (US)

(72) Inventor: Toru Tanigawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 53 days.

(21) Appl. No.: 16/773,095

(22) Filed: Jan. 27, 2020

(65) Prior Publication Data

US 2020/0250432 A1 Aug. 6, 2020

(30) Foreign Application Priority Data

Feb. 1, 2019 (JP) .............................. JP2019-016935

(51) Int. Cl.
*G06K 9/00* (2006.01)
*G06K 9/62* (2006.01)

(52) U.S. Cl.
CPC ..... *G06K 9/00671* (2013.01); *G06K 9/00684* (2013.01); *G06K 9/628* (2013.01); *G06K 9/6256* (2013.01)

(58) Field of Classification Search
CPC .. G06K 9/00671; G06K 9/6256; G06K 9/628; G06K 9/00684
See application file for complete search history.

(56) References Cited

U.S. PATENT DOCUMENTS

| 9,996,516 | B2 * | 6/2018 | Masuko | G06F 40/169 |
|---|---|---|---|---|
| 10,747,946 | B2 * | 8/2020 | Nakamura | G06F 40/268 |
| 2011/0242603 | A1 | 10/2011 | Saito | |
| 2014/0307958 | A1 * | 10/2014 | Wang | G06K 9/6256 382/159 |
| 2015/0213328 | A1 * | 7/2015 | Mase | G06K 9/4671 382/201 |
| 2016/0147826 | A1 * | 5/2016 | Mishra | G01C 21/32 707/736 |
| 2018/0373943 | A1 * | 12/2018 | Tanigawa | G06K 9/6256 |
| 2019/0026558 | A1 * | 1/2019 | Tanigawa | G06T 15/205 |
| 2020/0074377 | A1 * | 3/2020 | Tanigawa | G06Q 10/06398 |

(Continued)

FOREIGN PATENT DOCUMENTS

| JP | 2011-221655 | 11/2011 |
|---|---|---|
| JP | 2013-161295 | 8/2013 |

*Primary Examiner* — Wesley J Tucker
(74) *Attorney, Agent, or Firm* — Wenderoth, Lind & Ponack, L.L.P.

(57) ABSTRACT

An annotation device includes: a similarity information obtainer that obtains similarity information indicating whether or not a plurality of labels to be added as annotation data to images are similar to each other; a determiner that determines a layout of the plurality of labels to be displayed on an operation screen for an annotation operation based on the similarity information; a data obtainer communicator that obtains the annotation data added to the images using the operation screen; and an inspector that inspects the annotation data obtained by the second communicator for an erroneously added label.

9 Claims, 7 Drawing Sheets

(56) References Cited

U.S. PATENT DOCUMENTS

2020/0160979 A1\* 5/2020 Lyman ................... G06F 3/0482
2020/0380312 A1\* 12/2020 Khan ..................... G06N 5/022
2021/0042530 A1\* 2/2021 Kim ...................... G06K 9/6256
2021/0056346 A1\* 2/2021 Tanigawa ............ G06K 9/00624
2021/0133485 A1\* 5/2021 Kubota .................. G06K 9/623

\* cited by examiner

FIG. 5A

| CLASSIFICATION LABEL | o BICYCLE<br>o MOTORCYCLE<br>o HUMAN | p2a

FIG. 5B

| CLASSIFICATION LABEL | o BICYCLE<br>o HUMAN<br>o MOTORCYCLE | p2b

ANNOTATION DEVICE, ANNOTATION METHOD, AND NON-TRANSITORY COMPUTER-READABLE STORAGE MEDIUM

CROSS REFERENCE TO RELATED APPLICATIONS

The present application is based on and claims priority of Japanese Patent Application No. 2019-016935 filed on Feb. 1, 2019. The entire disclosure of the above-identified application, including the specification, drawings and claims is incorporated herein by reference in its entirety.

FIELD

One or more exemplary embodiments disclosed herein relate generally to an annotation device, an annotation method, and a non-transitory computer-readable storage medium.

BACKGROUND

In construction of training data for machine learning or other occasions, annotation data such as labels are added to image data to recognize image data. For example, Japanese Unexamined Patent Publication No. 2013-161295 discloses a technique of labeling image data.

SUMMARY

Technical Problem

Annotation data is added to an object such as a person or a thing included in an image. The annotation data is added by a person inputting the data into the image. For example, a person looks at an object included in an image and selects, out of a plurality of labels, a label corresponding to the object to add the label. At this time, the label may be erroneously selected by an erroneous operation of the person. Detection of a label erroneously added by an erroneous operation is thus desired.

One non-limiting and exemplary embodiment provides an annotation device, an annotation method, and a storage medium that detect annotation data highly likely to be a label erroneously added by an erroneous operation.

Solution to Problem

In one general aspect, the techniques disclosed here feature an annotation device including: a similarity information obtainer that obtains similarity information indicating whether or not a plurality of labels to be added as annotation data to an image are similar to each other; a determiner that determines a layout of the plurality of labels to be displayed on an operation screen for an annotation operation based on the similarity information; a data obtainer that obtains the annotation data added to the images using the operation screen; and an inspector that inspects the annotation data obtained by the data obtainer for an erroneously added label.

In one general aspect, the techniques disclosed here feature an annotation method including: obtaining similarity information indicating whether or not a plurality of labels to be added as annotation data to images are similar to each other; determining a layout of the plurality of labels to be displayed on an operation screen for an annotation operation based on the similarity information; obtaining the annotation data added to the images using the operation screen; and inspecting the annotation data obtained in the obtaining of the annotation data for an erroneously added label.

In one general aspect, the techniques disclosed here feature a storage medium that is a non-transitory computer-readable storage medium for use in a computer. The storage medium has a computer program recorded thereon for causing the computer to execute the annotation method described above.

General and specific aspect(s) disclosed above may be implemented using a system, a method, an integrated circuit, a computer program, or a non-transitory computer-readable storage medium such as a CD-ROM, or any combination of systems, methods, integrated circuits, computer programs, or computer-readable recording media. The program may be stored in advance in the storage medium or may be supplied to the storage medium via wide area communication network such as internet.

Additional benefits and advantages of the disclosed embodiment will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An annotation device, an annotation method, and a storage medium according to one or more exemplary embodiments or features disclosed herein detect annotation data highly likely to be a label erroneously added by an erroneous operation.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5A shows an example display order of labels according to a comparative example.

FIG. 5B shows an example display order of labels according to the exemplary embodiment.

DESCRIPTION OF EMBODIMENT

Figure 1:
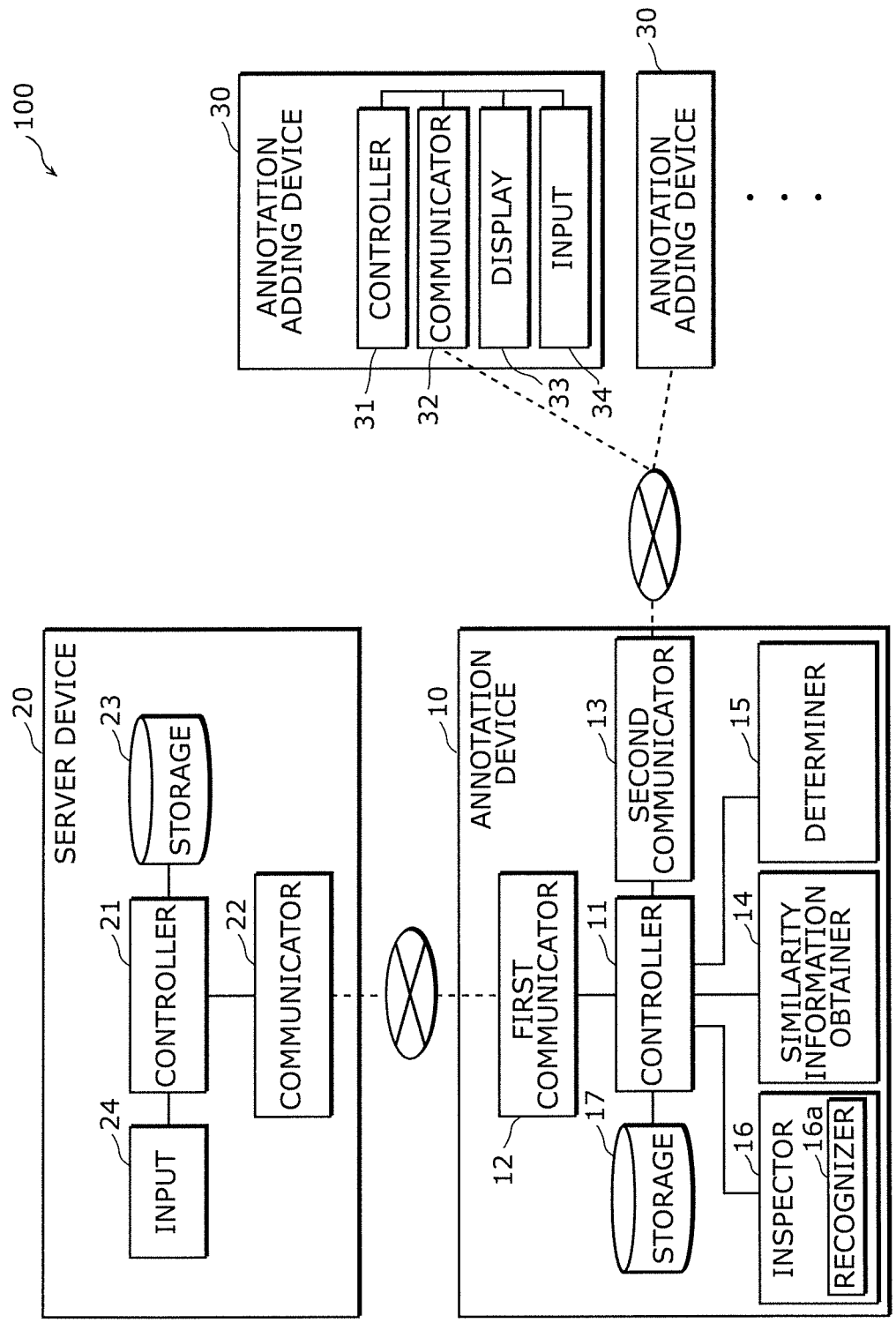
FIG. 1 is a block diagram illustrating a configuration of an annotation adding system according to one exemplary embodiment.

Underlying Knowledge Forming Basis of the Present Disclosure

In relation to the annotation device, the annotation method, and the storage medium disclosed in the Background section, the inventors have found the following problem:

In deep learning that is one of machine learning methods, recognition of an object requires a large amount of image data for learning. For example, hundred thousand to one million units of image data for learning are required. Information including, for example, the content, position, and region of an object is added as annotation data to the object in image data for learning. An annotation operation for adding annotation data to an object is typically made by a person who inputs, to an image, settings of the region (e.g., a region indicated by a bounding box) around the object by surrounding the object on the image and a label (e.g., human, bicycle, or motorcycle) for recognizing the object included in the region. In order to produce a highly accurate recognizer, construction of a high-quality training data set is desired.

On the other hand, in recent years, the use of crowdsourcing for creating such a training data set has been considered. The crowdsourcing allows construction of the training data set at low costs.

Operators of annotation operations using crowdsourcing have, however, not always high IT skills and thus may cause erroneous operations such as erroneous addition of a label. If a training data set includes data such as an erroneously added label, a high-quality training data set cannot be constructed, which hinders, as a result, production of a highly accurate recognizer.

To address the problem, the present inventor has studied how to create a high-quality training data set utilizing crowdsourcing. As a result of diligent studies, the present inventor conceived of the following annotation device etc. capable of detecting annotation data highly likely to be a label erroneously added by an erroneous operation.

According to an exemplary embodiment disclosed herein, an annotation device includes: a similarity information obtainer that obtains similarity information indicating whether or not a plurality of labels to be added as annotation data to an image are similar to each other; a determiner that determines a layout of the plurality of labels to be displayed on an operation screen for an annotation operation based on the similarity information; a data obtainer that obtains the annotation data added to the images using the operation screen; and an inspector that inspects the annotation data obtained by the data obtainer for an erroneously added label.

In this way, the layout of the plurality of labels to be arranged on the operation screen are determined based on the similarity information. This improves the rate of the inspector detecting an erroneous operation of an operator. For example, the layout of the plurality of labels are determined based on the similarity information so that labels similar to each other are not adjacent to each other. This allows the inspector to detect an erroneous operation more accurately than in the case where labels similar to each other are adjacent to each other. For example, assume that labels similar to each other are adjacent to each other and the operator selects a label adjacent to the label to be selected actually, due to an erroneous operation. In this case, the inspector cannot determine whether the recognition and operation of the operator are both correct, or the object has been correctly recognized but the label may have been erroneously added by an erroneous operation. On the other hand, out of the plurality of labels according to the aspect of the present disclosure, labels similar to each other are not adjacent to each other. If, in this case, the operator selects a label adjacent to the label to be selected actually, due to an erroneous operation, the inspector can detect that the label may have been erroneously added by the erroneous operation of the operator. Since adjacent labels are dissimilar to each other, the label is less likely to have been erroneously added by erroneous recognition of the object by the operator. Therefore, the annotation device according to the aspect of the present disclosure detects annotation data highly likely to be a label erroneously added by an erroneous operation.

For example, the plurality of labels include a first label and a second label that are similar to each other, and a third label that is dissimilar to the first label and the second label. The determiner determines the layout to display the third label between the first label and the second label on the operation screen.

In this way, the plurality of labels are displayed on the operation screen so that labels similar to each other are not adjacent to each other. For example, assume that the operator selects a label adjacent to the label indicating the object included in an image, due to an erroneous operation. Since the two labels are dissimilar to each other, the inspector can detect annotation data highly likely to be a label erroneously added by the erroneous operation.

For example, the inspector includes a recognizer that has been trained using a predetermined set of training data, and determines that a label included in the annotation data obtained has been erroneously added, if, out of the plurality of labels, a label corresponding to a recognition result of an image obtained by the recognizer is, on the operation screen, adjacent to the label included in the annotation data obtained.

With this configuration, the inspector including the recognizer easily inspects an erroneously added label. Specifically, the inspector easily inspects annotation data highly likely to be a label erroneously added, by comparing the recognition result obtained by the recognizer to the label included in the obtained annotation data.

For example, the plurality of labels further include a fourth label dissimilar to the first label, the second label, and the third label. The determiner determines the layout to further display the fourth label between the first label and the second label on the operation screen.

In this way, if a label may have been erroneously added, it can be assumed which label was to be actually selected by the operator. An example will be described where the first label is the label indicating the object included in an image, the labels are arranged in the order of the first, third, fourth, and second labels, and the operator added the third label due to an erroneous operation. In this case, the third and fourth labels are dissimilar to each other, and the operator is thus less likely to have selected the third label instead of the fourth label due to an erroneous operation. It can be therefore assumed that the operator has actually intended to select the first label. The first label can be identified as the "label indicating the object" by inspection of the inspector (e.g., the recognition result obtained by the recognizer).

For example, the determiner further determines display colors of the plurality of labels arranged on the operation screen based on the similarity information.

In this way, the labels are classified by colors based on the similarity information. This improves the visibilities of the labels on the operation screen. Accordingly, the operation efficiency of the operator of the annotation operation for adding annotation data improves.

For example, the determiner determines display colors of similar ones of the plurality of labels to be more similar to each other than a display color(s) of a non-similar label(s) among the plurality of labels.

In this way, similar labels (e.g., animals or vehicles) are classified in the same color. This further improves the visibilities of the labels on the operation screen. Accordingly, the operation efficiency of the operator further improves.

For example, the annotation device further includes: a label information obtainer that obtains label information to be added to the images. If the label information includes three or more labels, the similarity information obtainer obtains similarity information on the three or more labels out of the plurality of labels.

In this way, even if a label used for an annotation operation is obtained from an external device, the determiner determines the layout of three or more labels by obtaining similarity information on the respective three or more labels obtained. Accordingly, if any three or more labels are obtained from a plurality of labels, the annotation device detects annotation data highly likely to be a label erroneously added by an erroneous operation.

According to an exemplary embodiment disclosed herein, an annotation method includes: obtaining similarity information indicating whether or not a plurality of labels to be added as annotation data to images are similar to each other; determining a layout of the plurality of labels to be displayed on an operation screen for an annotation operation based on the similarity information; obtaining the annotation data added to the images using the operation screen; and inspecting the annotation data obtained in the obtaining of the annotation data for an erroneously added label.

This method provides at least the same advantages as the annotation device.

These general and specific aspects may be implemented using a system, a method, an integrated circuit, a computer program, or a non-transitory computer-readable storage medium such as a CD-ROM, or any combination of systems, methods, integrated circuits, computer programs, or computer-readable recording media.

Hereinafter, a certain exemplary embodiment is described in greater detail with reference to the accompanying Drawings.

The exemplary embodiment described below shows a general or specific example. The numerical values, shapes, materials, elements, the arrangement and connection of the elements, steps, the processing order of the steps etc. shown in the following exemplary embodiment is a mere example, and therefore do not limit the scope of the appended Claims and their equivalents. Therefore, among the elements in the following exemplary embodiment, those not recited in any one of the independent claims are described as optional elements.

The figures are schematic representations and not necessarily drawn strictly to scale. In the figures, substantially the same constituent elements are assigned with the same reference marks, and redundant descriptions will be omitted or simplified.

In the specification, the terms such as "the same" representing the relations between the constituent elements, the terms such as "rectangle" representing the shapes of the constituent elements, the numerical values, and the numerical ranges do not have exact meanings only and include substantially equivalent ranges with differences of several percentages.

Exemplary Embodiment

An annotation device and other aspects according to this exemplary embodiment will be described with reference to FIGS. 1 to 7.

1. Configuration of Annotation Adding System

Annotation adding system 100 including the annotation device according to this exemplary embodiment will be described with reference to FIG. 1. FIG. 1 is a block diagram illustrating a configuration of annotation adding system 100 according to this exemplary embodiment.

As shown in FIG. 1, annotation adding system 100 includes annotation device 10, server device 20, and annotation adding devices 30. Server device 20 is an element that stores various data. Each annotation adding device 30 is a device that adds annotation data to images. Annotation device 10 is an element that performs the following, for example. The device obtains, from server device 20, images to which annotation data are to be added, and sends the obtained images to annotation adding devices 30. The device receives the added annotation data from annotation adding devices 30, and detects, out of the received annotation data, annotation data highly likely to have been erroneously added to a label. The device sends, to server device 20, information including the detection result in correspondence to the images. That is, annotation device 10 is a relay device that relays flow of information between server device 20 and annotation adding devices 30, while inspecting the information.

In this exemplary embodiment, annotation device 10 is operated by a constructor of a large amount of image data for learning such as machine learning, for example, via neural network including deep learning. Server device 20 may be operated by the constructor or others.

Server device 20 is configured to communicate with annotation device 10. Server device 20 may be an information processing device such as a computer. Server device 20 may include one or more server device(s) or may constitute a cloud system. Server device 20 includes controller 21, communicator 22, storage 23, and input 24. Controller 21 controls server device 20 as a whole. Communicator 22 communicates with annotation device 10. Storage 23 stores various data. Input 24 receives inputs. Communicator 22 communicates with annotation device 10 via communication network such as internet. Communicator 22 may be a communication circuit including a communication interface. For example, communications via wireless local area network (LAN) such as wireless fidelity (Wi-Fi (registered trademark)), wired communications using cables, or other wireless or wired communications may be established between communicator 22 and annotation device 10.

Storage 23 is, for example, a hard disk that stores images for annotation captured by various imaging devices.

Input 24 is an element that receives various inputs such as instructions. Input 24 receives the inputs, for example, from the constructor described above. Input 24 may be, for example, a mouse, a keyboard, or a touch panel that receives, as inputs, the operations of the constructor. Alternatively, input 24 may be a microphone that receives, as inputs, voice or sound of the constructor.

Controller 21 controls communicator 22, storage 23, and input 24. Controller 21 causes storage 23 to store associated data from annotation device 10 via communicator 22. Controller 21 takes out data from storage 23 in accordance with the input received from input 24 via communicator 22 and sends the data. In addition, controller 21 causes storage 23 to store information (e.g., operation results, recognition results, and determination results, which will be described later) received from annotation device 10 via communicator 22.

Annotation device 10 may be a single device or may be built in an information processing device such as a computer or another device. Annotation device 10 includes controller 11, first communicator 12, second communicator 13, similarity information obtainer 14, determiner 15, inspector 16, and storage 17. Controller 11 controls annotation device 10 as a whole.

First communicator 12 communicates with communicator 22 of server device 20 via communication network such as internet. First communicator 12 may be a communication circuit including a communication interface. For example, communications via wireless LAN such as Wi-Fi (registered trademark), wired communications using cables, or other wireless or wired communications may be established between first communicator 12 and server device 20. A router, which is a communication device that relays communications between first communicator 12 and communicator 22, may be interposed therebetween. The router may relay communications between first communicator 12 and the communication network.

Second communicator 13 communicates with annotation adding devices 30. Second communicator 13 may be a communication circuit including a communication interface. Communications via communication network such as internet and communications under a mobile communication standard utilized for mobile communication systems such as third generation (3G) mobile communication systems, fourth generation (4G) mobile communication systems, or a standard such as long term evolution (LTE) for mobile devices may be established between second communicator 13 and annotation adding devices 30, as between first communicator 12 and annotation adding devices 30.

Similarity information obtainer 14 is controlled by controller 11 to obtain information on the similarity between labels used for an annotation operation. Specifically, similarity information obtainer 14 obtains similarity information indicating whether or not a plurality of labels to be added as annotation data to images are similar to each other. The similarity information may be a result of the determination on whether or not the labels are similar to each other or the similarity levels indicating how the labels are similar to each other.

Determiner 15 is controlled by controller 11 to determine a display order of the plurality of labels to be displayed on an operation screen for the annotation operation. Specifically, determiner 15 determines the display order of the plurality of labels to be displayed on the operation screen for the annotation operation based on the similarity information on the respective labels obtained by similarity information obtainer 14. More specifically, determiner 15 determines the display order of the plurality of labels based on the similarity information described above to display, between ones of the plurality of labels similar to each other, at least one label dissimilar to the labels. In this exemplary embodiment, determiner 15 determines the display order of the plurality of labels to display, ones of the plurality of labels similar to each other, one label dissimilar to the labels. Note that the display order of the plurality of labels is an example layout of the plurality of labels.

Figure 2:
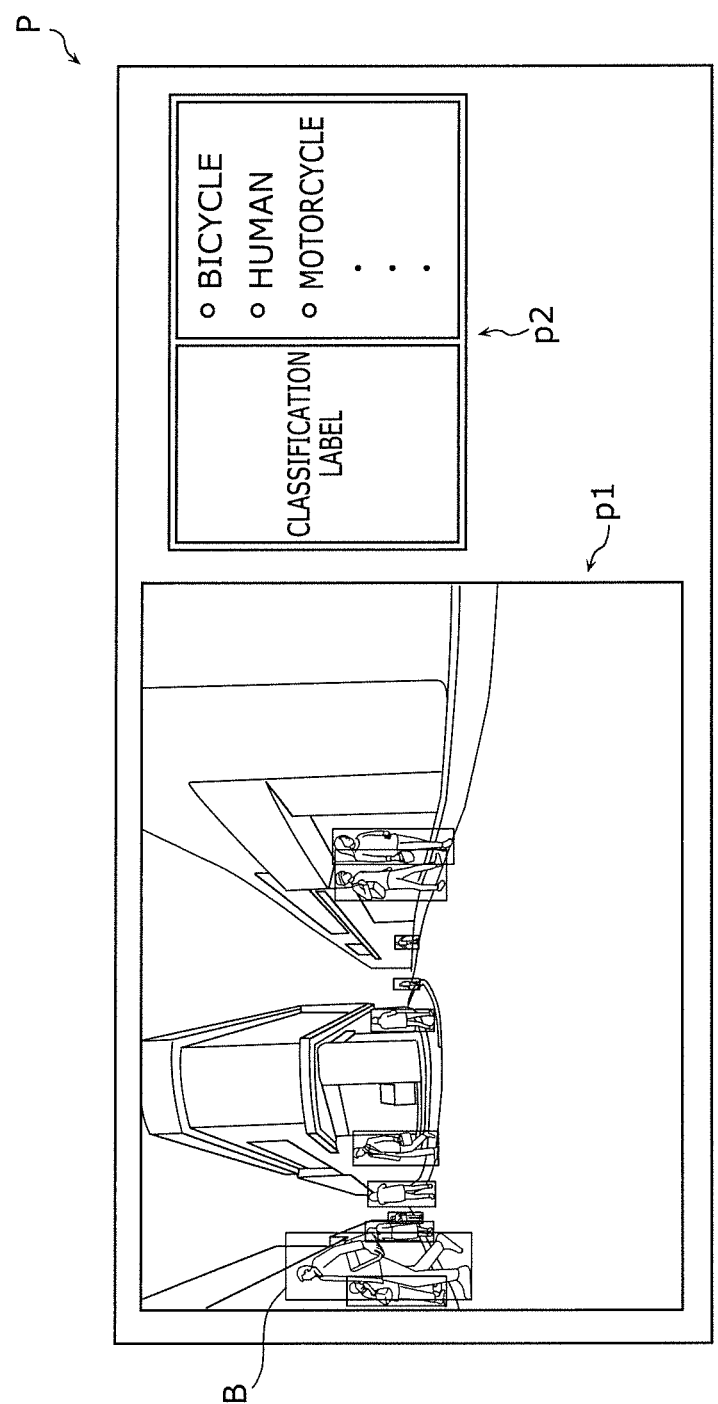
FIG. 2 illustrates an example operation screen according to the exemplary embodiment.

Now, the operation screen will be described with reference to FIG. 2. FIG. 2 illustrates example operation screen P according to this exemplary embodiment. The operator performs an annotation operation, while looking at operation screen P displayed by display 33 of each annotation adding device 30.

As shown in FIG. 2, operation screen P includes image p1 and label list p2. Image p1 is subjected to an annotation operation. The operator sets a region (e.g., bounding box B in FIG. 2) of an object in image p1, and selects the label indicating the object present in the region from label list p2. In the example of FIG. 2, label list p2 includes labels (i.e., classifying labels) of "bicycle", "human", and "motorcycle". While label list p2 includes, for example, three or more labels, the number is not particularly limited.

Determiner 15 determines the display order of the plurality of labels included in label list p2 of operation screen P based on the similarity information on the labels. Determiner 15 determines the display order of the plurality of labels as shown in, for example, FIG. 3 which will be described later.

Referring back to FIG. 1, inspector 16 inspects the annotation data obtained from each annotation adding device 30 for an erroneously added label. That is, inspector 16 detects, out of the plurality of annotation data obtained from annotation adding device 30, annotation data highly likely to be a label erroneously added. Specifically, inspector 16 detects, out of the plurality of annotation data obtained from annotation adding device 30, annotation data highly likely to be a label erroneously added based on the display order of the plurality of labels determined by determiner 15.

Inspector 16 includes recognizer 16a that has been trained in advance using a predetermined (e.g., published) training data set. Recognizer 16a constructs a machine learning model for detecting an erroneously added label. Recognizer 16a uses neural network for machine learning but may use another machine learning method. Recognizer 16a may output only recognition results and exclude a framework for learning, for example.

Storage 17 may be, for example, a hard disk that stores a table from which similarity information obtainer 14 obtains the similarity information. In addition, storage 17 stores information (e.g., operation results which will be described later) received from annotation adding devices 30 and recognition and determination results (hereinafter referred to as "inspection results") obtained by inspector 16.

Figure 3:
FIG. 3 is an example table for obtaining similarity levels according to the exemplary embodiment.

Now, the table stored in storage 17 will be described with reference to FIG. 3. FIG. 3 shows example table T for obtaining the similarity levels according to this exemplary embodiment. For explanation, an example will be described where table T includes three labels of "bicycle", "motorcycle", and "human".

As shown in FIG. 3, for example, when an image of a bicycle is input, recognizer 16a outputs "bicycle" at 60%, "motorcycle" at 35%, and "human" at 5%. This means that, when an image of a bicycle is input, recognizer 16a outputs the correct answer at 60%. When an image of a "bicycle" is input, recognizer 16a outputs, at 35%, "motorcycle" whose appearance is similar to that of a bicycle.

Table T as described above is determined, for example, in accordance with the predetermined training data set used for the learning of recognizer 16a. Table T is prepared based on, for example, a result of recognition (i.e., output) of a predetermined image by recognizer 16a, which has been trained using the predetermined training data set. The predetermined image includes an object indicated by a label. Table T is prepared, for example, based on a result (percentage) of how many correct outputs were made by recognizer 16a.

Referring back to FIG. 1, each annotation adding device 30 is an element capable of sending and receiving information to and from annotation device 10. Annotation adding device 30 is a terminal device owned by the operator who performs the annotation operation by crowdsourcing, for example. Annotation adding device 30 may be an information processing device such as a computer, a mobile phone, or a portable terminal such as a smartphone, a smartwatch, a tablet, or a small-sized personal computer. The operator who performs the annotation operation using annotation adding device 30 is different from the constructor described above. The operator of annotation adding device 30 makes a contract regarding adding processing of annotation data with the constructor, and adds annotation data to images provided by the constructor. That is, the operator of annotation adding device 30 is the processor of the annotation data.

Each annotation adding device 30 includes controller 31, communicator 32, display 33, and input 34. Controller 31 controls annotation adding device 30 as a whole. Communicator 32 may be a communication circuit including a communication interface. Communicator 32 communicates with second communicator 13 of annotation device 10. The communications therebetween are established as described above.

Display 33 is an element that displays operation screen P and may be, for example, a liquid crystal panel or an organic or inorganic electro-luminescence (EL) panel. Input 34 is an element that receives various inputs such as instructions. Input 34 may be configured independently from display 33 or may be a touch panel that is integral with display 33 and receives inputs touched by the operator.

The plurality of annotation adding devices 30 included in annotation adding system 100 may have the same configuration. The number of annotation adding devices 30 included in annotation adding system 100 is not particularly limited and may be one, three, or more.

The constituent elements such as controller 21 of server device 20, controller 11, similarity information obtainer 14, determiner 15, and inspector 16 of annotation device 10, and controller 31 of each annotation adding device 30 may be configured as exclusive hardware executing software programs suitable for the respective constituent elements. In this case, each constituent element may include, for example, an arithmetic processor (not shown) and a storage (not shown) storing control programs. The arithmetic processor may be, for example, a micro processing unit (MPU) or a central processing unit (CPU). The storage may be, for example, a memory such as a semiconductor memory. The constituent elements may be single elements that perform centralized control or a plurality of elements that perform decentralized control in cooperation with each other. The software programs may be, as applications, provided through communications via communication network such as internet or communications under a mobile communication standard.

The constituent elements may be, for example, circuits for large scale integration (LSI) or system LSI. A plurality of constituent elements may constitute, as a whole, a single circuit or may be individual circuits. The circuits may be general-purpose circuits or exclusive circuits.

Each system LSI circuit is a super multifunctional LSI circuit produced by integrating a plurality of components on a single chip. Specifically, the system LSI circuit is a computer system including, for example, a microprocessor, a read-only memory (ROM), and a random-access memory (RAM). The RAM stores computer programs. The microprocessor operates in accordance with the computer programs so that the system LSI circuit fulfills its functions. The system LSI circuit or the LSI circuit may be a field-programmable gate array (FPGA) programmable after the production of the LSI circuit. The FPGA may include a reconfigurable processor capable of reconfiguring connections and setting of circuit cells inside the LSI circuit.

Some or all of the constituent elements described above may be removable integrated circuit (IC) cards or single modules. Each IC card or module may be a computer system including, for example, a microprocessor, a ROM, and a RAM. Each IC card or module may include the LSI circuit or the system LSI circuit described above. The microprocessor operates in accordance with the computer programs so that the IC card or module fulfills its functions. Such an IC card or module may be resistant to tamper attempts.

2. Operation of Annotation Adding System

Now, an operation of annotation adding system 100 described above will be described with reference to FIGS. 4 to 7. Specifically, an operation of annotation device 10 will be described.

Figure 4:
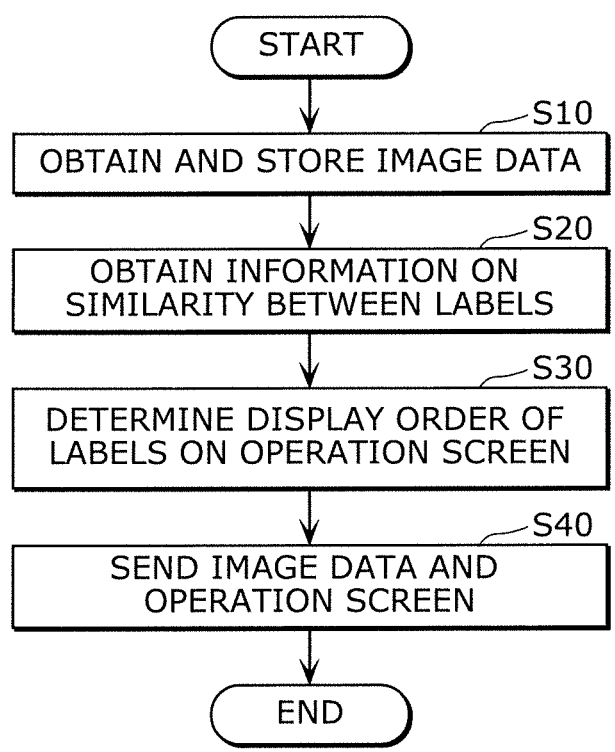
FIG. 4 is a flowchart showing processing of an annotation device according to the exemplary embodiment until sending an operation screen to an annotation adding device.

First, processing of annotation device 10 generating and sending operation screen P will be described with reference to FIGS. 4 to 5B. FIG. 4 is a flowchart showing processing until annotation device 10 according to this exemplary embodiment sends operation screen P to annotation adding device 30. An example will be described where "bicycle", "motorcycle", and "human" shown in FIG. 3 are the labels to be added to images.

First, as shown in FIG. 4, annotation device 10 obtains and stores image data to which annotation data are added (S10). Specifically, controller 11 obtains image data from server device 20 via first communicator 12 and causes storage 17 to store the obtained image data. In other words, storage 17 functions as an image database storing image data. For example, upon receipt of an instruction to send image data from a constructor via input 24, server device 20 sends the matching image data to annotation device 10.

Similarity information obtainer 14 obtains then information on the similarity between the labels to be added as annotation data to the images (S20). Similarity information obtainer 14 obtains the information on the similarity between the plurality of labels included in table T stored in storage 17 based on, for example, table T. Similarity information obtainer 14 may determine, for example, that labels are similar to each other, if the percentages of the labels shown as output results in table T are higher than a predetermined value. The predetermined value is, for example, 20% but not limited thereto. The value only needs to allow determination, for example, that labels with similar appearances are similar to each other. An example will be described where the predetermined value is 20%.

As shown in FIG. 3, in response to an input "bicycle", "bicycle", and "motorcycle" may be output at 60% and 35%, respectively. In response to an input "motorcycle", "bicycle", and "motorcycle" may be output at 40% and 55%, respectively. That is, recognizer 16a outputs "motorcycle" instead of "bicycle" and "bicycle" instead of "motorcycle" at percentages higher than or equal to 20%. In this case, similarity information obtainer 14 determines that "bicycle" and "motorcycle" are similar to each other.

As shown in FIG. 3, in response to inputs "bicycle" and "motorcycle", "human" may be output at 5%. In response to an input "human", "bicycle", and "motorcycle" may be output at 3% and 4%, respectively. That is, recognizer 16a outputs "human" instead of "bicycle" or "motorcycle" and "bicycle" or "motorcycle" instead of "human" at percentages lower than 20%. In this case, similarity information obtainer 14 determines that "human" is dissimilar to "bicycle" and "motorcycle".

The percentages where "motorcycle" may be output instead of "bicycle" and where "bicycle" may be output instead of "motorcycle" will be described as an example. If at least one of the two percentages are 20% or higher, similarity information obtainer 14 may determine that "bicycle" and "motorcycle" are similar.

The percentages of outputting, out of outputs in response to an input "bicycle", the labels (i.e., "motorcycle" and "human" in the example of FIG. 3) other than the "bicycle" may be regarded as similarity levels indicating how the appearances of the "bicycle" and the others are similar. For example, it can be said that determiner 15 determines the layout of the plurality of labels to be displayed on the operation screen, based on the similarity levels.

The label "bicycle" is an example of a first label, "motorcycle" is an example of a second label, and "human" is an example of a third label.

Determiner 15 determines then the display order of the labels on operation screen P based on the similarity information obtained by similarity information obtainer 14 (S30). Specifically, determiner 15 determines the display order of the plurality of labels to place, between two labels that are similar to each other, a label dissimilar to the two labels. That is, determiner 15 determines the layout of the plurality of labels to be displayed on the operation screen so that two labels similar to each other are not adjacent to each other. Determiner 15 prohibits adjacent arrangement of labels (e.g., "bicycle" and "motorcycle") similar to each other, for example, in appearance.

FIG. 5A illustrates an example display order of labels according to a comparative example. FIG. 5B illustrates an example display order of labels according to this exemplary embodiment.

As shown in FIG. 5A, in label list p2a according to the comparative example, a plurality of labels are arranged in the order of: "bicycle", "motorcycle", and "human". That is, the labels (i.e., "bicycle" and "motorcycle" in the example of FIG. 5A) similar to each other are adjacent to each other.

As shown in FIG. 5B, in label list p2b according to this exemplary embodiment, a plurality of labels are arranged in the order of: "bicycle", "human", and "motorcycle". That is, the labels similar to each other are arranged not to be adjacent to each other. Specifically, determiner 15 determines the layout of the plurality of labels to display the label "human" between the labels "bicycle" and "motorcycle" on operation screen P.

Controller 11 sends then the image data and operation screen P to annotation adding device 30 via second communicator 13 (S40). In other words, second communicator 13 sends, to annotation adding device 30, the image data and operation screen P showing the labels in the display order determined by determiner 15. This allows the operator of annotation adding device 30 to perform an annotation operation using operation screen P including label list p2b as shown in FIG. 5B.

An example has been described in step S20 where similarity information obtainer 14 obtains the similarity information on the respective labels included in table T. The present disclosure is however not limited thereto. For example, controller 11 obtains label information for identifying a label to be added to an image, from server device 20 via first communicator 12. If the label information includes three or more labels, similarity information obtainer 14 may obtain similarity information on the respective three or more labels out of a plurality of labels (e.g., a plurality of labels included in table T). In this case, first communicator 12 functions as a label information obtainer that obtains label information on the label to be added to the image. Out of the plurality of labels, only the three or more labels are displayed on the label list of the operation screen. Determiner 15 determines the display order of the three or more labels based on the similarity information on the respective three or more labels. If the label information includes two or less label(s), there is no need for similarity information obtainer 14 to obtain the similarity information on the respective two or less label(s).

In step S30, determiner 15 may further determine display colors of the plurality of labels to be arranged on operation screen P for an annotation operation based on the similarity information obtained by similarity information obtainer 14. Determiner 15 may determine, for example, the display colors of similar labels to be more similar to each other than the display color(s) of the non-similar label(s). Determiner 15 may determine, for example, the display colors of similar labels to be the same. Accordingly, for example, adjacent labels are displayed in different display colors. An example will be described using "bicycle", "motorcycle", and "human". Determiner 15 determines the display colors of the respective labels based on the similarity information to display "bicycle" and "motorcycle" in a color (e.g., red) different from the color (e.g., blue) of "human". The display colors mean the colors of text strings representing the labels.

Figure 6:
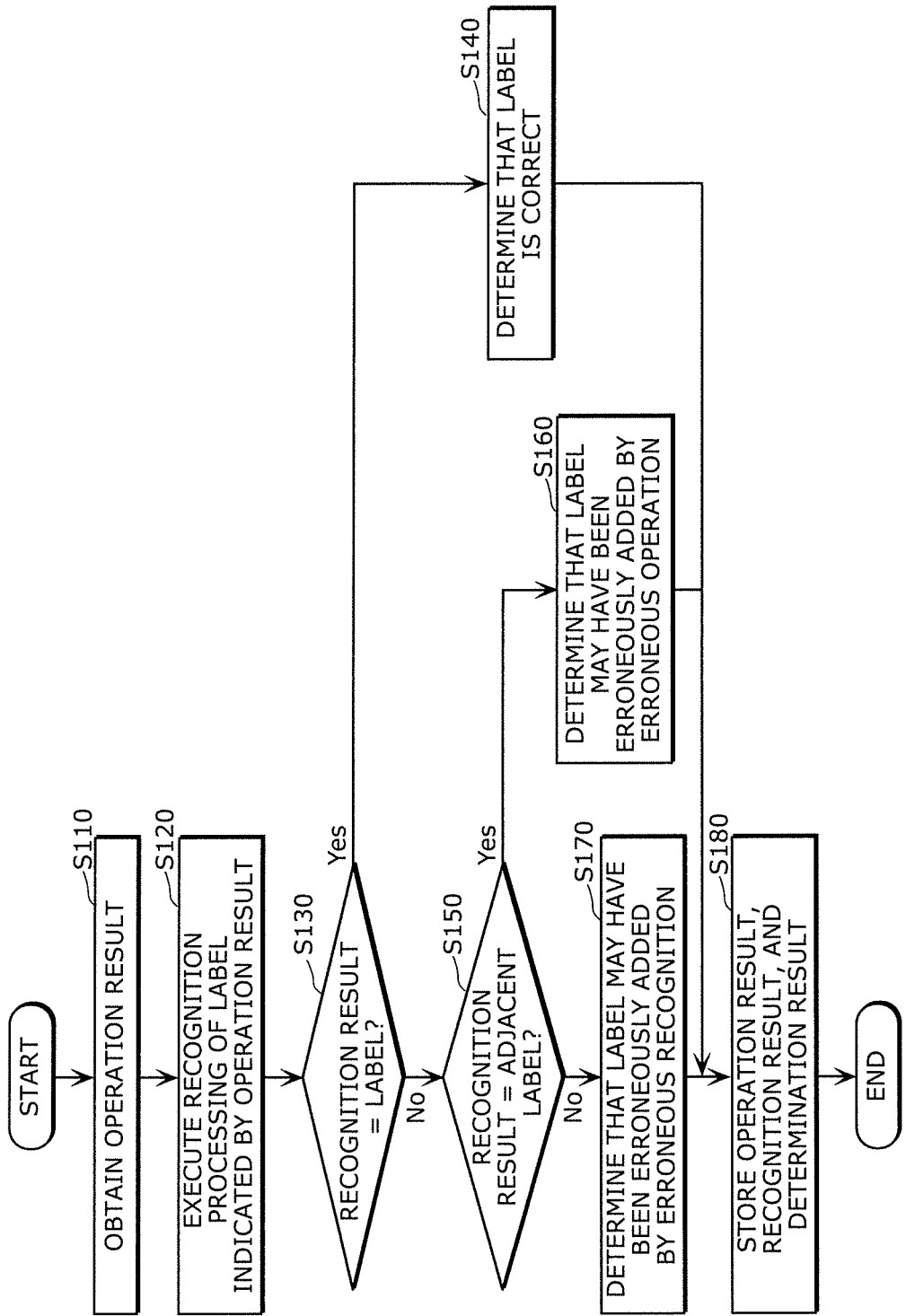
FIG. 6 is a flowchart showing processing of the annotation device according to the exemplary embodiment that inspects for an erroneously added label.

Now, inspection results of operations (annotation operations) by an operator will be described with reference to FIGS. 6 and 7. FIG. 6 is a flowchart showing inspecting processing by annotation device 10 according to this exemplary embodiment for an erroneously added label.

First, as shown in FIG. 6, annotation device 10 obtains an operation result from annotation adding device 30 (S110). Specifically, controller 11 obtains an operation result from annotation adding device 30 via second communicator 13. The operation result includes annotation data added to images. In other words, second communicator 13 obtains, from annotation adding device 30, the annotation data added to the images using operation screen P showing the labels in the display order determined by determiner 15. At this time, second communicator 13 functions as a data obtainer that obtains the annotation data from annotation adding device 30.

Inspector 16 is then controlled by controller 11 to execute recognition processing of the label indicated by the operation result (S120). Specifically, inspector 16 inputs an image, to which the annotation data obtained as the operation result is added, to the neural network constructed by recognizer 16a to obtain a recognition result corresponding to the input image. The recognition result is, for example, any one of "bicycle", "human", and "motorcycle".

Inspector 16 determines whether or not the recognition result of the image matches the label included in the operation result (S130). Inspector 16 determines that the label is correct (S140), if the recognition result matches the label (Yes in S130). If the recognition result does not match the label (No in S130), inspector 16 determines whether or not the recognition result is a label adjacent to the label included in the operation result (S150). For example, if the recognition result of the image is "bicycle" and the label "human" is added to the image, inspector 16 determines that the recognition result matches the label adjacent to the label included in the operation result (Yes in S150).

Here, in this exemplary embodiment, "bicycle" and "human" are labels adjacent to each other but dissimilar to each other. The operator is thus less likely to recognize an object that is actually a "bicycle" as a "human" and add a label "human" to the image. That is, the operator is more likely to select the label "human" that is adjacent to "bicycle" due to an erroneous operation, although he/she has recognized the object that is actually a "bicycle" as a "bicycle". If the answer is Yes in step S150, inspector 16 determines that a label is erroneously added by an erroneous operation (S160). In other words, inspector 16 determines that the label included in the obtained annotation data may have been erroneously added by an erroneous operation in the following case. Out of the plurality of labels, the label corresponding to the result of the recognition of an image by recognizer 16a and the label included in the obtained annotation data are adjacent to each other on operation screen P (i.e., in the display order determined by determiner 15).

As described above, if the answer in step S150 is Yes, inspector 16 determines that the annotation data is highly likely to be a label erroneously added by an erroneous operation of the operator.

The comparative example will be described where labels are displayed on the operation screen the display order shown in FIG. 5A and a recognition result indicates a label adjacent to the label included in the operation result. For example, if the recognition result of the image is a "bicycle" and the label "motorcycle" is added to the image, inspector 16 determines that the recognition result matches the label adjacent to the label included in the operation result (Yes in S150).

Here, in the comparative example, "bicycle" and "motorcycle" are labels adjacent to each other and similar to each other. The operator may have recognized an object that is actually a "bicycle" as a "motorcycle" and added a label "motorcycle" to the image. Alternatively, the operator may have recognized an object that is actually a "motorcycle" as a "bicycle", since the result of recognition by recognizer 16a was incorrect. That is, in the comparative example, if the answer in step S150 is Yes, inspector 16 cannot precisely determine whether or not the annotation data is highly likely to be a label erroneously added.

By contrast, as described above, determiner 15 according to this exemplary embodiment does not arrange labels similar to each other to be adjacent to each other as shown in FIG. 5B. Accordingly, if "Yes" has been determined in step S150, the inspection of inspector 16 determines that a label may have been erroneously added by an erroneous operation of the operator (S160).

For example, if the recognition result of the image indicates a "bicycle" and the label "motorcycle" is added to the image, inspector 16 determines that the recognition result does not match any label (e.g., "human") adjacent to the label included in the operation result (No in S150). In this case, "bicycle" and "motorcycle" are labels similar to each other. The operator may have erroneously recognized an object that is actually a "bicycle" as a "motorcycle". Accordingly, if "No" has been determined in step S150, the inspection of inspector 16 determines that a label may have been erroneously added by erroneous recognition of the operator (S170).

Inspector 16 causes storage 17 to store the operation result obtained from annotation adding device 30, the recognition result obtained by recognizer 16a, and the determination result obtained by inspector 16 (S180). That is, storage 17 functions as an annotation database that stores the annotation data added to an image together with the inspection result (e.g., the detection result) of the annotation data. FIG. 7 illustrates an example of data D to be stored in storage 17 according to this exemplary embodiment.

Figure 7:
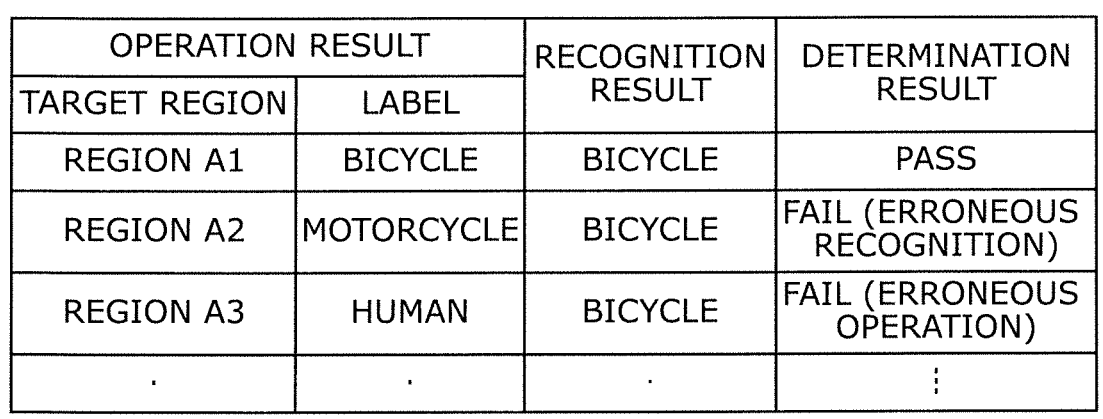
FIG. 7 illustrates example data stored in a storage according to the exemplary embodiment.

As shown in FIG. 7, inspector 16 causes storage 17 to store the operation result, the recognition result, and the determination result in correspondence to each other. Regions A1 to A3 are, for example, different regions of an image. Regions A1 to A3 may be indicated by coordinates on the image.

Controller 11 may send data D to server device 20. Accordingly, the constructor easily knows annotation data likely to be a label erroneously added, by confirming data D. The constructor copes with the erroneous addition by correcting the annotation data highly likely to be a label erroneously added and causes the operator to newly add annotation data. This allows accurate construction of a training data set. For example, the constructor further executes, after the correction, processing of the operation result in step S110 to S180 to allow more accurate construction of a training data set.

The times when inspector 16 executes the inspection processing (i.e., S120 to S180) are not particularly limited. Inspector 16 may execute the inspection processing every time when obtaining an operation result from annotation adding device 30 or after obtaining a plurality of operation results.

Variation of Exemplary Embodiment

Figure 8:
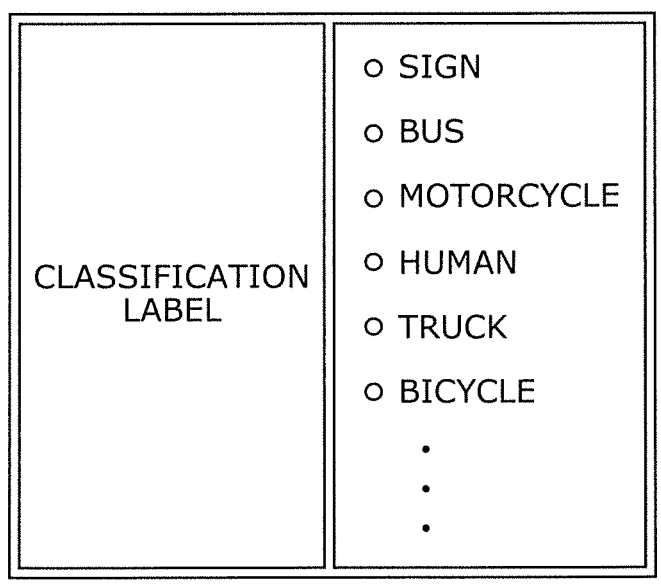
FIG. 8 shows an example display order of labels according to a variation of the exemplary embodiment.

Now, an annotation device and other aspects according to this variation will be described with reference to FIG. 8. The annotation device according to this variation has the same configuration as in the exemplary embodiment, and explanation thereof will be omitted. In this variation, a determiner determines the display order of a plurality of labels in a different way from the exemplary embodiment, which will be mainly described. FIG. 8 illustrates an example display order of labels according to this variation.

As shown in FIG. 8, label list p2c includes the labels of "sign", "bus", "motorcycle", "human", "truck", and "bicycle". Here, assume that "sign" and "human" are labels similar to each other, "bus" and "truck" are labels similar to each other, and "motorcycle" and "bicycle" are labels similar to each other. The labels other than the "labels similar to each other" are dissimilar to the "labels similar to each other". In an example using "motorcycle", "motorcycle" is similar only to "bicycle" out of "sign", "bus", "human", "truck", and "bicycle" and dissimilar to the other labels. This determination is executed by similarity information obtainer 14.

In this case, determiner 15 determines the display order of a plurality of labels based on the similarity information to place, between labels (e.g., "motorcycle" and "bicycle") similar to each other, two labels dissimilar to the labels. Determiner 15 determines, for example, the display order to place, between labels similar to each other, two labels similar neither to the labels nor to each other. For example, determiner 15 determines the display order to place "human" and "truck" between the labels "motorcycle" and "bicycle" similar to each other. That is, determiner 15 determines the layout of the plurality of labels on operation screen P to display "human" and "truck" between "motorcycle" and "bicycle". Note that "truck" is an example of a fourth label.

A case will be described where the plurality of labels have been arranged as described above and a label may have been erroneously added by an erroneous operation. Specifically, in this case, the recognition result obtained by recognizer 16a is different from the label included in the operation result. The labels are displayed in the display order shown in FIG. 8. The label included in the operation result is "human" and the recognition result obtained by recognizer 16a is a "motorcycle".

At this time, "motorcycle" and "truck" are labels dissimilar to each other. This may because: the operator has selected "human" instead of "motorcycle" due to an erroneous operation, or the operator has selected "human" instead of "truck" due to an erroneous operation. It can be determined that the former is more likely to occur. That is, inspector 16 can assume the label to be actually selected by the operator. The assumption result is, as an inspection result, stored in storage 17. Note that "motorcycle" and "truck" are dissimilar to each other, which is less likely to cause erroneous determination of the operator.

On the other hand, assume that only the label "human" is interposed between "motorcycle" and "bicycle", the label included in the operation result is "human", and the recognition result obtained by recognizer 16a is a "motorcycle". At this time, "motorcycle" and "bicycle" are labels similar to each other. It is thus difficult to accurately determine whether the operator has selected "human" instead of "motorcycle" due to an erroneous operation or the operator has selected "human" instead of "bicycle" due to an erroneous operation.

Determiner 15 may determine the display order to place, between labels (e.g., "motorcycle" and "bicycle") similar to each other, three or more labels similar neither to the labels nor to each other. That is, determiner 15 may determine the display order to place at least two or more labels between labels similar to each other.

Other Embodiments

While the present disclosure has been described based on the exemplary embodiment, the present disclosure is not limited to the exemplary embodiment described above.

For example, an example has been described above in the exemplary embodiment where the similarity information obtainer determines that the labels are similar to each other, if the matching rate (e.g., similarity level) of the output result is higher than a predetermined value. The present disclosure is however not limited thereto. The similarity information obtainer may determine that a label (e.g., motorcycle) as which an object (e.g., bicycle) is most likely to be erroneously recognized is similar to the label of the object. That is, the similarity information obtainer may determine that a label most similar to the label of the object as a label similar to the label of the object. In this case, there is no need to set any "predetermined value".

An example has been described above in the exemplary embodiment where the similarity information obtainer determines that there is one label (e.g., motorcycle) similar to a label (e.g., bicycle). The present disclosure is however not limited thereto. The similarity information obtainer may determine there are two or more labels similar to the label (e.g., bicycle).

An example has been described above in the exemplary embodiment where the similarity information obtainer obtains, as similarity information, the result of determination on whether or not labels are similar to each other. The present disclosure is however not limited thereto. The similarity information obtainer may obtain, as similarity information, results gradually indicating how similar labels are. The similarity information may indicate, for example, the similarity at "high", "middle", and "low" levels. The determiner may place, between labels with "high similarity", a label with "low" similarity to the labels. The similarity information obtainer sets two predetermined values to classify the similarity of the two labels into "high", "middle", and "low" levels.

An example has been described above in the exemplary embodiment where the similarity information obtainer determines whether or not labels are similar to each other based on the appearance of an object indicated by one of the labels. The present disclosure is however not limited thereto. The similarity information obtainer may determine whether or not labels are similar to each other based on, for example, the appearance of the label itself (e.g., the text string).

An example has been described above in the exemplary embodiment where the table stored in the storage of the annotation device shows the matching rates. The present disclosure is however not limited thereto. The table may show, for example, the result of determination on whether or not labels are similar to each other. In this case, the similarity information obtainer obtains similarity information from the table without determining whether or not labels are similar to each other.

An example has been described above in the exemplary embodiment where the plurality of labels are aligned in the label lists vertically on the paper. The present disclosure is however not limited thereto. The alignment direction of the plurality of labels on the label lists is not particularly limited. The labels may be aligned along horizontally on the paper.

An example has been described above in the exemplary embodiment where the inspector includes a neural network recognizer. The present disclosure is however not limited thereto. The inspector may include, for example, a pattern matching recognizer.

How to divide functional blocks in block diagrams is a mere example. A plurality of functional blocks may be achieved by a single functional block. A single functional block may be divided into a plurality of functional blocks. Some functions are implemented by other functional blocks. The functions of a plurality of functional blocks with similar functions may be implemented by single hardware or software in parallel or in time division.

The annotation device may be a single device or be composed of a plurality of devices. If the annotation device is composed of the plurality of devices, the constituent elements of the annotation device may be divided in any way into the plurality of devices.

The orders of executing the steps in the flowcharts are mere examples for specifically describing the present disclosure and may be other orders. Some of the steps may be executed simultaneously (in parallel).

The present disclosure includes other embodiments, such as those obtained by variously modifying the exemplary embodiment as conceived by those skilled in the art or those achieved by freely combining the constituent elements and functions in the exemplary embodiment without departing from the scope and spirit of the present disclosure.

INDUSTRIAL APPLICABILITY

An annotation device etc. according to an aspect of the present disclosure is useful for an annotation adding system for adding annotation data to images.

The invention claimed is:

1. An annotation device, comprising:
   a similarity information obtainer that obtains similarity information indicating whether or not a plurality of labels to be added as annotation data to an image are similar to each other;
   a determiner that determines a layout of the plurality of labels to be displayed on an operation screen for an annotation operation based on the similarity information;

a data obtainer that obtains the annotation data added to the images using the operation screen; and an inspector that inspects the annotation data obtained by the data obtainer for an erroneously added label.

2. The annotation device according to claim 1, wherein the plurality of labels include a first label and a second label that are similar to each other, and a third label that is dissimilar to the first label and the second label, and the determiner determines the layout to display the third label between the first label and the second label on the operation screen.

3. The annotation device according to claim 2, wherein the inspector includes a recognizer that has been trained using a predetermined set of training data, and determines that a label included in the annotation data obtained has been erroneously added, if, out of the plurality of labels, a label corresponding to a recognition result of an image obtained by the recognizer is, on the operation screen, adjacent to the label included in the annotation data obtained.

4. The annotation device according to claim 2, wherein the plurality of labels further include a fourth label dissimilar to the first label, the second label, and the third label, and the determiner determines the layout to further display the fourth label between the first label and the second label on the operation screen.

5. The annotation device according to claim 1, wherein the determiner further determines display colors of the plurality of labels arranged on the operation screen based on the similarity information.

6. The annotation device according to claim 5, wherein the determiner determines display colors of similar ones of the plurality of labels to be more similar to each other than a display color(s) of a non-similar label(s) among the plurality of labels.

7. The annotation device according to claim 1, further comprising:

a label information obtainer that obtains label information to be added to the images, wherein if the label information includes three or more labels, the similarity information obtainer obtains similarity information on the three or more labels out of the plurality of labels.

8. An annotation method, comprising:

obtaining similarity information indicating whether or not a plurality of labels to be added as annotation data to images are similar to each other;

determining a layout of the plurality of labels to be displayed on an operation screen for an annotation operation based on the similarity information;

obtaining the annotation data added to the images using the operation screen; and inspecting the annotation data obtained in the obtaining of the annotation data for an erroneously added label.

9. A non-transitory computer-readable storage medium for use in a computer, the storage medium having a computer program recorded thereon for causing the computer to execute the annotation method according to claim 8.

* * * * *